(12) United States Patent
Blomberg et al.

(10) Patent No.: US 6,355,124 B1
(45) Date of Patent: Mar. 12, 2002

(54) LAMINATION APPARATUS AND PROCESS

(75) Inventors: Chris Blomberg, Minneapolis; Gert Levin; Sujal Bhalakia, both of Plymouth, all of MN (US)

(73) Assignee: BMC Vision-Ease Lens, Inc., Ramsey, MN (US)

( * ) Notice: Subject to any disclaimer, the term of this patent is extended or adjusted under 35 U.S.C. 154(b) by 0 days.

(21) Appl. No.: 09/317,297

(22) Filed: May 24, 1999

(51) Int. Cl.[7] .............................. B32B 31/00; G02C 7/02
(52) U.S. Cl. .................. 156/99; 156/74; 156/275.5; 156/275.7; 156/556; 156/566; 351/177
(58) Field of Search ................. 156/74, 99, 272.2, 156/275.5, 275.7, 379.8, 556, 566, 560; 351/159, 177

(56) References Cited

U.S. PATENT DOCUMENTS

| | | | |
|---|---|---|---|
| 2,618,200 A | 11/1952 | Clave et al. | 88/54 |
| 2,833,680 A | 5/1958 | Kneeling | |
| 3,846,013 A | 11/1974 | Cohen | |
| 4,645,317 A | 2/1987 | Frieder et al. | 351/164 |
| 4,828,769 A | 5/1989 | Maus et al. | 264/1.3 |
| 4,867,553 A | 9/1989 | Frieder | 351/172 |
| 4,883,548 A | 11/1989 | Onoki | 156/99 |
| 4,892,903 A | 1/1990 | Himes | 524/488 |
| 4,927,480 A | 5/1990 | Vaughan | 156/228 |
| 4,969,729 A | 11/1990 | Merle | 351/168 |
| 5,399,227 A | 3/1995 | Abrams | 156/539 |
| 5,433,810 A | 7/1995 | Abrams | 156/273.7 |
| 5,514,214 A | 5/1996 | Joel et al. | |
| 5,744,193 A * | 4/1998 | Kitano | 156/74 |
| 5,858,163 A * | 1/1999 | Wood et al. | 156/530 |
| 6,109,748 A * | 8/2000 | Spector et al. | 351/159 |

FOREIGN PATENT DOCUMENTS

| | | |
|---|---|---|
| EP | 0895234 | 2/1999 |
| WO | 9634735 | 11/1996 |
| WO | 9722894 | 6/1997 |

* cited by examiner

*Primary Examiner*—Jeff H. Aftergut
*Assistant Examiner*—John T. Haran
(74) *Attorney, Agent, or Firm*—Mark A. Litman & Associates, P.A.

(57) ABSTRACT

A method and apparatus for the lamination of two lens blanks to form an ophthalmic lens comprise:

a) providing a first ophthalmic lens blanks having two major surfaces thereon;

b) applying a hardenable liquid adhesive to less than an entire one of said at least two major surfaces of said first ophthalmic lens blank;

c) placing a second ophthalmic lens blank into contact with the hardenable liquid adhesive, forming an association of two lens blanks with the hardenable liquid adhesive between the two lens blanks;

d) rotating said association of two lens blanks to assist in spreading the hardenable liquid adhesive; and e) after at least some of said hardenable liquid adhesive has spread, hardening said hardenable liquid adhesive to laminate the two lens blanks into a laminated ophthalmic lens. This method provides a relatively automated process and apparatus for performing that automated process for the lamination of ophthalmic lenses.

15 Claims, 5 Drawing Sheets

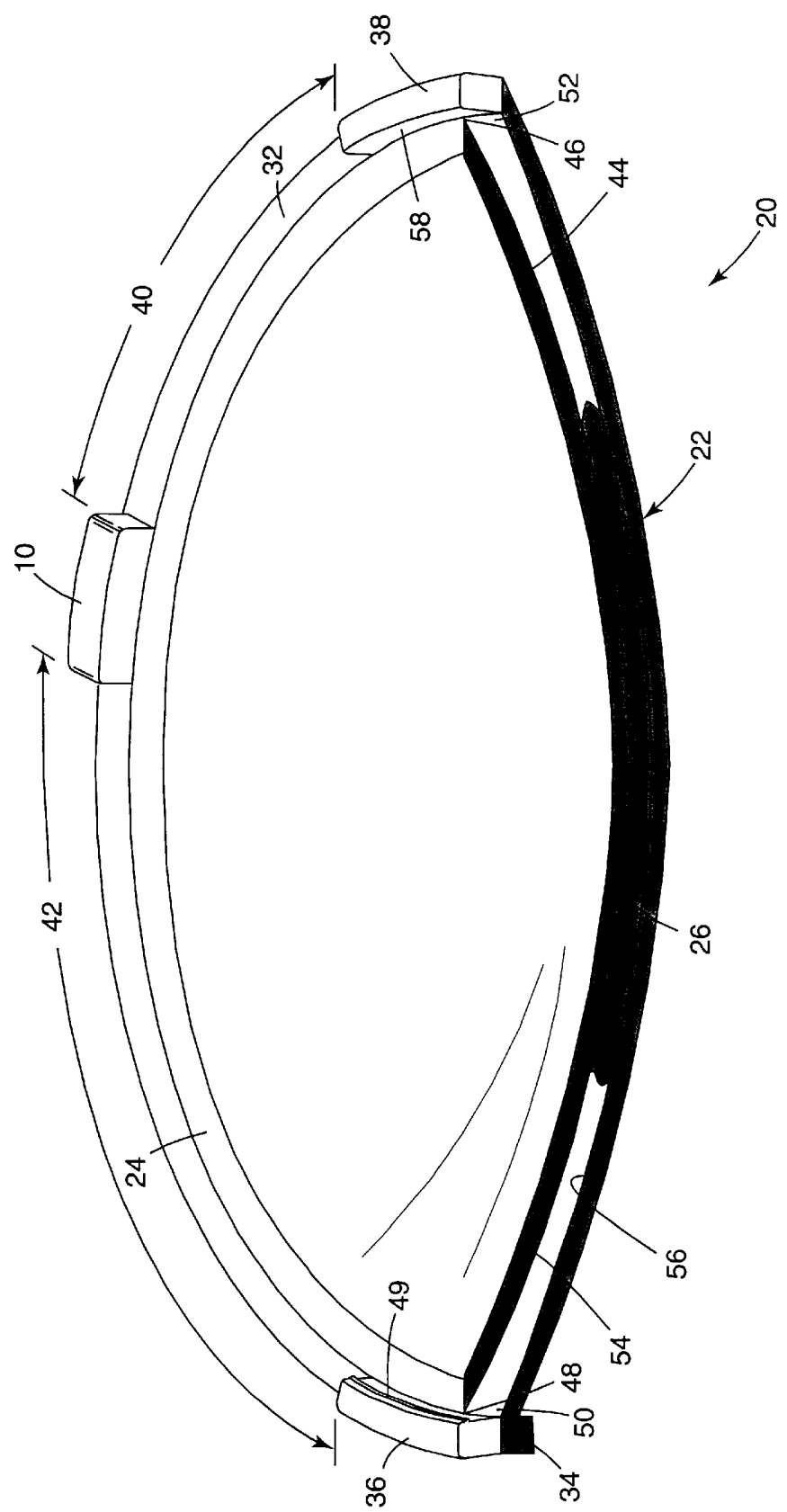

LAMINATION APPARATUS AND PROCESS

BACKGROUND OF THE INVENTION

1. Field of the Invention

The present invention relates to a process and apparatus for laminating two ophthalmic lens blanks to form a finished ophthalmic lens that may be sized to fit an eyeglass frame. More particularly, the present invention relates to a semi-automated lamination process and apparatus for laminating spherical and cylinder power ophthalmic lens blanks in a properly oriented alignment of the lens blanks.

2. Background of the Art

The present invention finds utility in a range of materials to be joined by adhesive securement, and it is applied most advantageously to molded thermoplastic articles such as lenses and optical disks.

Lenses are used for a wide variety of purposes. For example, microscopes, telescopes, magnifying glasses and other optical instruments, as well as ophthalmic spectacles, employ lenses. The following discussion focuses on the most immediately commercial embodiment of the present invention, ophthalmic lenses.

Vision-corrective, prescription (Rx) spectacle lenses or ophthalmic lenses increasingly employ plastic lens materials instead of the more traditional glass. In fact, in the United States, the demand for plastic lenses is multiples of that for glass lenses. This is because:

1. plastic is lighter than glass, which is particularly advantageous where stronger prescriptions and thicker lenses must be used;
2. durable abrasion-resistant coatings have become available for plastic;
3. plastic can be provided in a wide range of fashionable colors and gradient-density tints;
4. production techniques have improved so that plastic lenses can be manufactured at higher rates, with more automation, and lower costs; and
5. plastic lenses may be provided in a much shorter time frame than glass lenses which would have to be ground to the prescription.

The relatively lighter weight and corresponding improved wearer comfort of plastic lenses are the most important considerations by the consumer. Since a nominal lens thickness (typically 2.0–2.2 mm) is the same for glass and plastic, plastic lenses' lighter weight is a direct result of plastic's lower density compared to that of glass. This factor holds true for all equivalent prescriptions in glass and plastics, but becomes particularly important when higher-powered corrections are required or when larger spectacle frames are chosen, requiring larger lens diameters and requiring greater thickness at the exterior (or interior) portion of the lens to continue the prescription curvature of the correction.

One method by which plastic prescription lenses are currently manufactured is by individually casting polycarbonate resins, or casting and curing allylic (or other ethylenically unsaturated) resins. Polycarbonate thermoplastic lenses have started to replace both cast-thermoset plastic and traditional glass lenses because of their lower density and higher refractive index. Polycarbonate lenses of the same nominal thickness provide even lighter weight than the cast-allylic plastics, and are of a much lower weight than glass. Additionally benefits result from this resin class because polycarbonate tends to have far greater impact strength and breakage resistance than any clear polymeric materials presently used for lenses, and even thinner lenses (in the range of 1.5–2.0 mm) are presently available, with the potential for even higher wearer preference.

Another method by which ophthalmic lenses, and especially ophthalmic lenses having segmented (bifocal or trifocal) prescriptions or continuous prescriptions (with a smooth gradation between various prescriptions) can be manufactured is by laminating sets of at least one interior lens blank and at least one exterior lens blank, with each of the interior and exterior lens blanks providing a specific contribution to the final prescription. Composite eyeglass lenses have been formed with this principle by bonding together front and rear lenses, as suggested in U.S. Pat. No. 2,618,200. A device and method for accomplishing this process has been suggested in U.S. Pat. No. 4,927,480. Generally, the bonding process involves placing a curable adhesive on the concave interface surface of the front lens; pressing the convex interface surface of the rear lens against the adhesive in the front lens to spread the adhesive throughout the space between the two lenses; and curing the adhesive to bond the lenses together, forming a composite lens which is then trimmed to fit within an eyeglass frame.

Even after individual lens blanks of good optical properties have been manufactured, it is equally important to form them into ophthalmic lenses for use by the customer. Segmented and progressive ophthalmic lenses must also be capable of construction from these lens elements. For example, U.S. Pat. Nos. 4,883,548; 4,867,553; and 4,645,317 show the formation of laminated ophthalmic lenses from at least two separate lens elements which are selected from a reserve and then associated to match a particular description. The at least two lens elements (one front and one rear lens) are adhesively secured together, with a photosetting resin and photinitiator suggested for the process (e.g., U.S. Pat. Nos. 4,883,548 and 4,867,553).

Especially when the desired composite lens includes a cylindrical component that must be properly oriented to correct for astigmatism and a bifocal or progressive focal region that must be properly positioned for reading purposes, the existing methods and equipment have fallen short of the desired optical accuracy. Existing laminating equipment, for example, does not readily accommodate eccentric positioning and bonding of the front and rear lenses, which can be necessary in some cases. Also, existing methods and equipment have been inconvenient in operation and have put the desirable accuracies beyond practical reach for some composite eyeglass lenses. U.S. Pat. No. 5,433,810 describes lamination or bonding together of front and rear lenses to form a composite eyeglass lens to address these perceived problems. It is asserted in U.S. Pat. No. 5,433,810 that a described new and better way of mounting, aligning, and bonding together composite eyeglass lenses improved on the accuracy attainable. That composite lens laminating system includes a front lens platform on a movable stage and a rear lens holder that is rotationally adjustable on a laminating axis and is movable along the laminating axis to press the rear lens against the front lens. Accurate positioning of each lens is assured by an X, Y adjustment of the stage holding the front lens platform, by an arrangement of locating pins and pressure feet that register and hold the rear lens on its holder, and rotational adjustment of the rear lens holder on the laminating axis. A simple and effective arrangement assures that the two lenses are pressed together with uniform pressure that spreads the adhesive evenly between them, and this process can be observed through the rear lens while the pressure is being applied. Then the bonding adhesive is cured while the two lenses are pressed together so that the accuracy of their positioning and the lack of any interruption in the adhesive layer are preserved during the curing process. Several specific procedures and structures contribute to achieving these effects; and the result is described as fast, effective, and more accurate than previous systems. That method of laminating front and rear lenses to form a composite eyeglass lens comprises:

a. holding a front face of the front lens in a mounting aperture positioned relative to a laminating axis;

b. mounting a rear face of the rear lens in a predetermined position on a holder that is movable along said laminating axis and holds the rear lens independently of the front lens;

c. rotatably orienting the holder relative to said axis to bring the rear lens into a desired angular relationship with the front lens while the rear lens is separated from the front lens;

d. placing a bonding material on a rear face of the front lens and moving the holder to bring a front face of the rear lens into engagement with the bonding material and to press the rear lens against the front lens in the direction of the laminating axis to force the bonding material to spread throughout a space between the two lenses; and e. curing the bonding material by directing curing radiation through the front lens while pressing and holding the rear lens against the front lens.

Polycarbonate's potential advantages over cast allylics were virtually offset by comparatively poorer abrasion resistance performance and poorer tintability, as well as restricted product line ranges and high manufacturing costs associated with low-volume production. Improved abrasion resistant coatings have overcome these limitations. Readily tintable coatings possessing good abrasion resistance have now become commercially available for polycarbonate lenses. Therefore the last major remaining drawback to the use of polycarbonate is associated with lens availability, breadth of product line, manufacturing costs, and order turnaround time.

The advantages and disadvantages associated with the use of polycarbonate are particularly pertinent and applicable to finished single-vision or multiple-vision lenses, which are supplied with one or both final-front-convex and back-concave optically finished surfaces, and optionally with a factory-applied tintable abrasion resistant coatings (e.g., often referred to in the art as "hardcoatings") on one or both surfaces. To convert such finished single-vision lenses (which constitute nearly half of all U.S. prescriptions filled) requires merely edging the excess lens away to fit a frame, and optionally tinting the lens to desired color with conventional dye baths, if the lens is not already tinted or photochromic.

Polycarbonate finished single-vision lens manufacturing has certain drawbacks which prevent their attaining lowest manufacturing costs and improved availability. A finished single-vision lens is optically defined by two measures of its light-bending power: spherical power (magnification) and cylindrical power (astigmatism correction), with units of power being read in diopters and various (e.g., 0.10, 0.25, etc.) units thereof. A product availability matrix which provides for sphere power ranging from at least about +4 to −6 diopters (with a broader range, e.g., from +6 to −8 easily possible) and cylinder power from 0 to +2 diopters (with a broader range to +3 diopters possible), constituting 273 or more (e.g., to 500) stock keeping units is desired. Within this matrix, there is a unit-volume frequency distribution curve which has at its approximate center a zero-power lens and which generally shows reduced frequency as sphere or cylinder power increases. To satisfy most incoming prescriptions on a statistical basis, a large matrix of stock keeping units must be maintained and inventoried for quick order turnaround if a particular manufacturer or lens type is to become popularly accepted in the market.

In addition to maintaining this wide range of product line, the lens manufacturer must necessarily produce high volumes of such thermoplastic-molded, hardcoated lenses.

Modem molding processes permit prescription lens molding at high yields, with minimal material scrap, without secondary operations of trimming, and with high levels of automation. Additionally, given the number of stock keeping units, each of which has a different statistical frequency distribution, it has become important to be able to run high volumes of differing lenses of differing powers (within some reasonable range) in a short period of time with minimum down time on the molding equipment, without sacrificing productivity, quality or yields. A four-cavity moldset, for example, quadruples the productivity associated with a particular molding machine without proportionately increasing its capital cost (i.e., increasing the capacity from one lens to four lenses may be less than 50% higher). For example, two of the cavities could be used to mold the most popular sphere and cylinder power combination and the remaining cavities could each handle a less popular lens, with more frequent changeovers of the latter cavities.

The lens blanks can be made by many different types of molding processes, including, but not limited to injection molding, stamping, coin pressing, and the like. For example, U.S. Pat. No. 4,828,769 discloses a method for injection molding articles, especially ophthalmic lens blanks, which method comprises forming a closed mold cavity for receiving plasticized resin without introducing significant back pressure therein, injecting into the closed mold cavity a mass of plasticized resin slightly larger than the mass of the article to be formed, applying a main clamp force of the injection molding equipment to reduce the volume of the closed mold cavity, thereby redistributing the resin contained within the cavity, and maintaining the applied main clamp force, thereby compressing the resin at least until the resin within the closed mold cavity solidifies. This one-step method is described as at least addressing some of the problems encountered in prior art injection molding processes when they had been attempted for use with ophthalmic lenses.

However, after the lens blanks are manufactured, it then becomes necessary to join at least the interior and exterior lens blanks to form the composite lens which can be a labor intensive and cost intensive step in the manufacturing process. U.S. Pat. No. 5,433,810 describes a process for the lamination of lens blanks into composite eyeglass lenses. A front face of a front lens is positioned in a mounting aperture relative to a laminating axis. A rear lens is mounted in a predetermined position on a holder that is movable along the laminating axis, with the holder supporting the rear lens (preferably independent of the front lens). The holder is rotatably oriented relative to the axis to bring the rear lens into a desired relationship with the front lens while the rear lens is separated from the front lens. A bonding material (e.g., UV curable adhesive) is placed on the rear surface of the front lens and the holder is moved to place the rear lens into engagement with the front lens and to force the bonding material to spread between the front and rear lens. The bonding agent is then hardened, as by exposing the bonding agent to curing radiation through the front lens.

U.S. Pat. No. 4,969,729 describes the lamination of lens blanks to form a composite lens by placing an adhesive between a front and rear lens then floating the lenses on a heated fluid to cure the adhesive. Indexing holes 17 are provided around the periphery of the lens blanks to assist in the proper relative optical positioning of the lenses with respect to each other. The lenses are rotated about an optical axis and the indexing holes are apparently used in assisting in the alignment of the lenses. A similar lamination process for adhering opposed etched surfaces of lens blanks without requiring the heating or floating in a liquid is described in U.S. Pat. No. 4,892,903, and indexing holes 17 are also described therein.

U.S. Pat. No. 5,399,227 describes a composite eyeglass lens laminating holder and a process used to laminate lens blanks to form a composite lens. The front and rear lenses of a composite ophthalmic lens are laminated together by holding the front lens in an X, Y adjustable stage on a laminating axis and holding a rear lens in a predetermined position relative to the laminating axis. The two lenses are moved together on the laminating axis to spread the adhesive. The rear lens holder is rotatable around a laminating axis and has an adjustable center foot adhesively tacked to the rear lens and an array of surrounding pressure feet for pressing the rear lens uniformly against the front lens. The adhesive between the two lenses is then cured by exposure to UV radiation through the front lens. It is preferred that the front lens has a tab or projection 18 which extends outward from its otherwise circular periphery, the tab to be received with a recess 19 to assure that the front lens has its bifocal region properly oriented on the platform supporting the lens.

It is of course desirable to provide alternative and more effective methods of laminating and curing ophthalmic lenses. One problem that has not been fully addressed by these references is the need to keep the front and rear lenses in center alignment during lamination. This type of centering would be especially critical where a centrifugal or rotational movement might be used to spread the adhesive between the lenses. Such rotational or spinning actions can readily shift the lenses out of their common ophthalmic or laminating axes, or out of ophthalmic alignment with respect to the desired positioning of the lens blank elements when laminated.

SUMMARY OF THE INVENTION

An apparatus and method of the invention allows for the semi-automatic or automatic lamination of two separate lens blanks into a properly aligned finished lens. A font lens blank and a rear lens blank are placed into a carriage element. The carriage element places the individual lens blanks together with an adhesive between the two lens blanks. At least one lens blank element may be automatically placed on top of the other lens blank element, and at least one of the lens blank elements may be rotated to assure that the cylinder alignment of the two lens blanks is properly oriented. The adhesive may be a radiation curable adhesive, with the lens blanks and adhesive association automatically moved to a radiation curing station. The automatic system provides safeguards for assuring the combination of proper lens blanks, and proper alignment of the elements, with a significant reduction in direct manual labor and a reduction in lamination time for each ophthalmic lens manufactured.

The apparatus may include associated software that identifies the individual lens elements to be selected from stock, the rotation of the lens blanks needed to properly orient the spherical and cylinder powers of the two lens blanks, inventory control, air filtration systems to remove dust and/or particulates from the lamination environment and other beneficial operations in the system.

BRIEF DESCRIPTION OF THE FIGURES

FIG. 5 shows a cutaway view of a prelamination association comprising a front lens 22, a rear lens and an intermediate, unspread layer of curable adhesive.

DETAILED DESCRIPTION OF THE INVENTION

Figure 1:
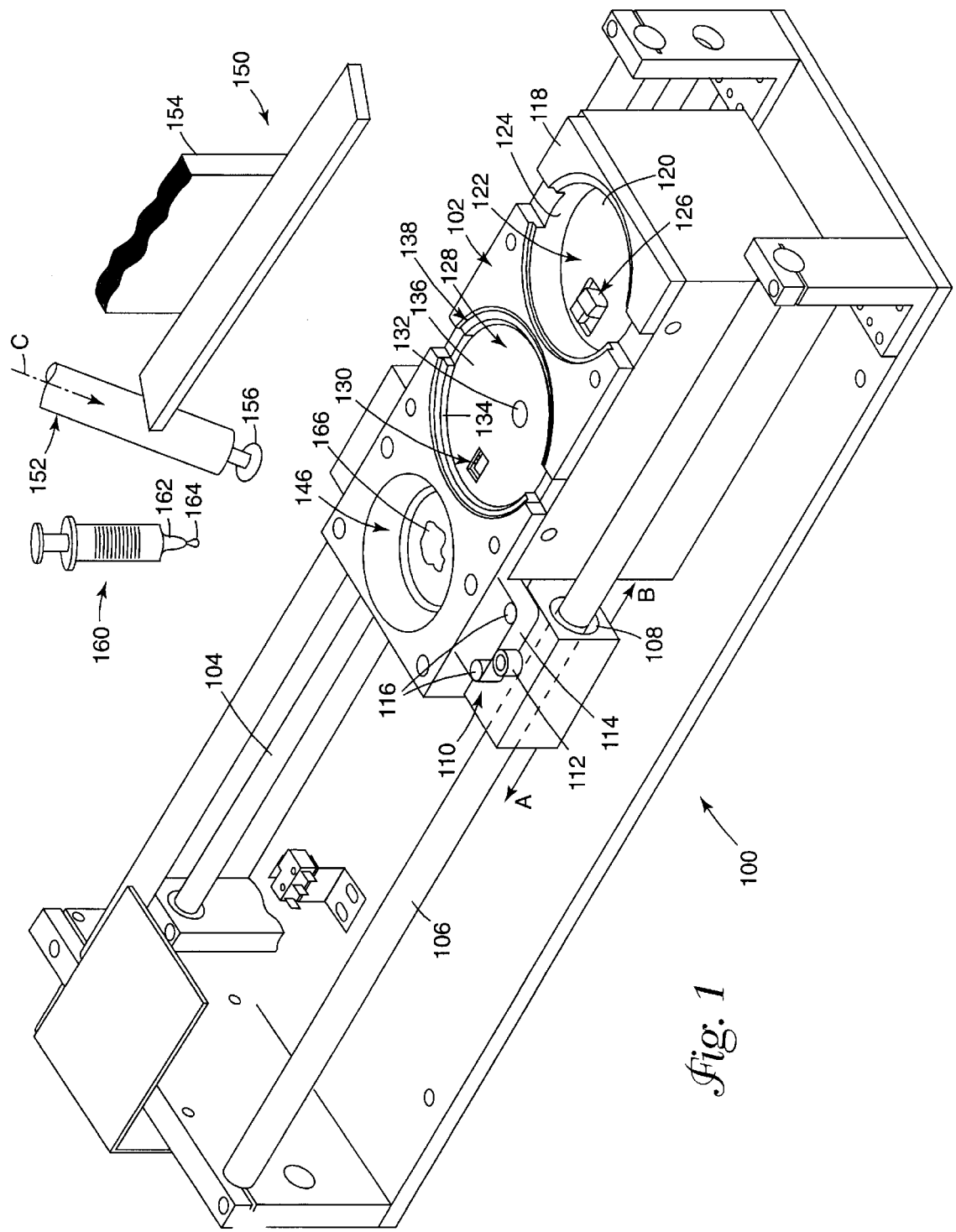
FIG. 1 shows a perspective view of a carriage element with support space for two lens blanks and a drip pan.

A process and apparatus for the semi-automatic or automatic lamination of at least two lens elements are provided that may use individual front and lens blank elements selected from stock. The at least two lens blank elements include at least a front lens blank element (that may provide spherical correction and/or bifocal or continuous gradation correction and or abrasion resistance and/or photochromic properties and/or tint) and the rear lens blank element (that may provide spherical correction and/or cylinder correction and/or abrasion resistance and/or photochromic properties and/or tint). The two lenses are placed into a moving carriage so that the convex face of the rear lens blank nests within the concave face of the front lens blank, with an adhesive between the two lens blanks. The carriage moves from various stations that may be available within the apparatus to provide individual functions such as storage of individual lens blanks to be associated, orientation of the lens blanks into their proper cylinder alignment, application of adhesive, rotation of the association of lens blanks with adhesive between them to spread the adhesive, curing of the adhesive, priming of an adhesive supply, and removal of the finished lens laminate. The carriage may of course be moved for any other operation desired in the preparation, inspection, cleaning or manufacture of the laminated lens element. The following description will discuss many different aspects, elements, individual steps, apparatus components, supported in a receiving area and rotated to assist in spreading the adhesive. The process will be defined according to a preferred mode of practicing the apparatus aspects of the invention, but the apparatus may vary and the process invention may be broader in practice than the specific apparatus and variations in the apparatus allow.

A process according to the present invention may alternatively comprise a method for the lamination of two lens blanks to form an ophthalmic lens comprising:

a) providing a first ophthalmic lens blanks having two major surfaces thereon;

b) applying a hardenable liquid adhesive to less than an entire one of the at least two major surfaces of the first ophthalmic lens blank;

c) placing a second ophthalmic lens blank into contact with the hardenable liquid adhesive, forming an association of two lens blanks with the hardenable liquid adhesive between the two lens blanks;

d) rotating the association of two lens blanks to assist in spreading the hardenable liquid adhesive; and e) after at least some of the hardenable liquid adhesive has spread, hardening the hardenable liquid adhesive to laminate the two lens blanks into a laminated ophthalmic lens.

The hardenable liquid adhesive may be a radiation polymerizable liquid adhesive, and the hardenable liquid is hardened by exposure to a sufficient amount of radiation to polymerize the hardenable liquid adhesive. The method for the lamination of two lens blanks to form an ophthalmic lens may also alternatively comprise:

a) placing a first ophthalmic lens blanks having two major surfaces thereon on a first lens blank support surface and placing a second ophthalmic lens blank having two major surfaces thereon on a second lens blank support surface;

b) applying a hardenable liquid adhesive to less than an entire one of the at least two major surfaces of the first ophthalmic lens blank while the first ophthalmic lens blank is on the first lens blank support surface;

c) removing the second ophthalmic lens blank from the second lens blank support surface and placing the second ophthalmic lens blank into contact with the hardenable liquid adhesive, forming an association of two lens blanks with the hardenable liquid adhesive between the two lens blanks;

d) spreading the hardenable liquid adhesive; and e) after at least some of the hardenable liquid adhesive has spread, hardening the hardenable liquid adhesive to laminate the two lens blanks into a laminated ophthalmic lens. The spreading of the hardenable liquid adhesive may be assisted by rotating the association of two lens blanks. The method may provide both the first lens blank support surface and the second lens blank support surface as each being separate recessed areas on a carriage element, so that as the carriage element moves, both the first lens blank support surface and the second lens blank support surface also move. After the first ophthalmic lens blank has been placed on the first lens blank support surface, the carriage may be moved to a first position where liquid adhesive is applied. After the first ophthalmic lens blank has been placed on the first lens blank support surface, the carriage may be moved to a first position where hardenable liquid adhesive is applied to the first ophthalmic lens blank and then moved to a second position where the second ophthalmic lens blank is placed into contact with the hardenable liquid adhesive on the first ophthalmic lens blank. The second ophthalmic lens blank may be placed into contact with the hardenable liquid adhesive by lifting the second ophthalmic lens blank from the second ophthalmic lens blank support surface to a stationary elevated position and then moving the carriage to a position where the first ophthalmic lens blank with hardenable liquid adhesive thereon is under the stationary elevated position of the second ophthalmic lens blank. After moving the carriage to a position where the first ophthalmic lens blank with hardenable liquid adhesive thereon is under the stationary elevated position of the second ophthalmic lens blank, the second ophthalmic lens blank is lowered into contact with the hardenable liquid adhesive. In a preferred embodiment explained in greater detail herein, after the second ophthalmic lens blank has contacted the hardenable liquid adhesive, the second ophthalmic lens blank is elevated so that some second portion of the hardenable liquid adhesive remains on the second ophthalmic lens blank, some first portion of the hardenable liquid adhesive remains on the first ophthalmic lens blank and the second portion and the first portion are not in contact with each other. After the first portion and the second portion are not in contact with each other, the second ophthalmic lens blank is lowered to place the first portion and second portion into contact with each other. After placing the first portion and second portion into contact with each other, the hardenable liquid adhesive is spread between the first ophthalmic lens blank and the second ophthalmic lens blank, forming the association of two lens blanks with the hardenable liquid adhesive between the two lens blanks. The hardenable liquid is preferably hardened by exposure to a sufficient amount of radiation to polymerize the hardenable liquid adhesive. The spreading of the hardenable liquid adhesive preferably is assisted by rotating the association of two lens blanks with the hardenable liquid adhesive between the two lens blanks. The rotating preferably is done around an axis of rotation, and the axis of rotation is approximately the same as an optical axis of the association of two lens blanks with the hardenable liquid adhesive between the two lens blanks. The method may utilize a first ophthalmic lens blank support area with a recessed area or projection that engages with a projection or recessed area, respectively, on the first ophthalmic lens blank.

The method may also comprise a) a first ophthalmic lens blank comprising a polymeric front optical element blank to be laminated to b) a second ophthalmic lens blank comprising a rear optical element blank comprising an optical element having an exterior convex surface and an interior concave surface, with an edge between the exterior convex surface and an interior concave surface, c) the first ophthalmic lens blank having at least two or at least three projections extending away from and higher than an edge on a side of the first ophthalmic lens blank having a concave surface, and d) the second ophthalmic lens blank forming the association of two lens blanks with the hardenable liquid adhesive between the two lens blanks by being position between the at least two projections. The method may use a first ophthalmic lens blank with at least three projections extending away from and higher than an edge on a side of the first ophthalmic lens blank having a concave surface and the second ophthalmic lens blank forming the association of two lens blanks with the hardenable liquid adhesive between the two lens blanks by being position between the at least three projections. The method may rotate the association of two lens blanks to assist in spreading the hardenable liquid adhesive and during the rotating, the second ophthalmic lens blank is in contact with at least one of the at least two or at least three projections. The hardenable liquid adhesive preferably is applied by depositing hardenable liquid adhesive from a syringe applicator onto a concave surface of the first ophthalmic lens blank. As further described herein, prior to applying the hardenable liquid to the first ophthalmic lens blank from the syringe applicator, an amount of hardenable liquid adhesive may be expelled from the syringe applicator onto a surface other than an ophthalmic lens blank (e.g., to prime the syringe and to cause a small amount of hardenable liquid adhesive to extend beyond a tip on the syringe. By having this small amount of hardenable liquid adhesive extend beyond the tip of the syringe, the hardenable liquid adhesive may be contacted with a surface of the first ophthalmic lens blank before the liquid hardenable adhesive is expelled from the syringe in amounts sufficient to laminate the two ophthalmic lens blanks. After contact with this small amount of liquid, the syringe may then apply additional amount(s) of hardenable liquid adhesive with reduced likelihood of forming bubbles. The surface other than an ophthalmic lens blank preferably is a drip tray attached to the carriage. The rotating, if performed, preferably is performed by rotating a surface within the first lens blank support area. The rotating of a surface within the first lens blank support area preferably is performed with the first ophthalmic lens blank secured to a floor surface of the first lens blank support area, but without the first ophthalmic lens blank being secured to walls within the first lens blank support area. The rotating preferably is performed by rotating a surface within the first lens blank support area. The association of two lens blanks preferably is rotated to assist in spreading the hardenable liquid adhesive and during the rotating, the second ophthalmic lens blank is in contact with at least one of the at least three projections.

An apparatus for the lamination of ophthalmic lens blanks according to the present invention may comprise:

a) a carriage having a first ophthalmic lens blank support recess and second ophthalmic lens blank support recess;

b) the carriage being capable of movement along a fixed linear path having at least three operating positions therein;

c) a first operating position comprising a position where a first ophthalmic lens is placed into the first ophthalmic lens blank support recess, a second operating position comprising a position different from said first position wherein the first ophthalmic lens blank support recess is located under a hardenable liquid adhesive applicator, and a third operating position different from the first and second operating positions comprising a position under a radiation emitting source. The may have a fourth operating position that is different from the first, second and third operating position and the fourth operating position comprises a position where the first ophthalmic lens blank support recess is located under a vertically extendable support for the second ophthalmic lens blank. The apparatus may provide the hardenable liquid adhesive applicator by a syringe applicator. The apparatus may have a fifth operating position that is different from the first, second, third and fourth operating positions, and the fifth operating position places a drip tray located on the carriage underneath the syringe applicator. The apparatus may have a drip tray with a removable insert for catching hardenable liquid adhesive from the syringe, the insert comprise a cup or tray, such as one made of paper, metal, polymer, composite, glass, ceramic or the like.

A process according to the present invention may comprise at least the following steps (with other steps being optionally added as desired without avoiding practice of the invention). At least two and usually only two lens blanks to be laminated to form a full prescription lens are provided. The use of lens blanks is fully comprehended and described for manual lamination in the prior art described above and as otherwise known in the art. There is a front lens blank element and a rear lens blank element. The individual lens blank elements may be provided with both ophthalmic corrective features (e.g., spherical, cylinder corrections, diopter corrections, bifocal power correction, continuous ophthalmic lens correction, etc.) and with other functional features (e.g., photochromic response, tint, hard coating, abrasion resistance, polarizing functionality, etc.). The various properties and/or functions may be provided on individual lens blanks in the at least two lens blanks or on both of the lens blanks as the case warrants. For example, both the front and rear lens blanks may have at least the surfaces that will be on the exterior of the finished prescription lens coated with an abrasion resistant coating (preferably applied to only the exterior surfaces, that is the rear surface of the rear lens blank and the front surface of the front lens blank, preferably applied as a factory coating). The tint, photochromic and/or polarizing functions may be applied to either or both lens blanks, spherical corrections may be applied to either or both lens blanks, cylinder corrections may be applied to either the front or rear lens blank (but preferably applied to the rear lens blank), bifocal corrections may be applied to either the front or rear lens blank (but preferably applied to the front lens blank), and it is preferred that the front surface of the rear lens blank and the rear surface of the front lens blank are free of abrasion resistant coating composition (although such coatings may be present on one or more of the lenses as a result of manufacturing process for the lens blanks).

The two lens blanks provided to form the laminated prescription ophthalmic lens are taken according to known techniques from a source of front and rear lens blanks that are maintained in stock. The lenses are selected and combined according to known physics and optics to combine and provide the prescription for ophthalmic correction. The prescription may combine any of the known corrective factors for ophthalmic treatment such as spherical corrections, cylinder corrections and the like. Based upon the prescription, front and rear lens blanks for each prescription lens are selected from stock. Any polymeric composition known to be useful in the manufacture of ophthalmic lenses and any polymeric materials developed in the future are amenable to use in the practice of this process. Preferred materials today include polycarbonate lens compositions (either aliphatic, aromatic, linear or three dimensional), polyurethanes, polyolefins, polacrylates (including methacrylates), polyvinyl resins (especially the acetates, diacetates, and triacetates; polyvinyl acetals, and the like), and polysiloxane polymers. It is usual to maintain a stock of spherical corrections to form a finished single-vision lens that is optically defined by two measures of its light-bending power: spherical power (magnification) and cylindrical power (astigmatism correction), with units of power being read in diopters and various (e.g., 0.10, 0.25, etc.) units thereof. A product availability matrix which provides for sphere power ranging from at least about +4 to −6 diopters (with a broader range, e.g., from +6 to −8 easily possible) and cylinder power from 0 to +2 diopters (with a broader range to +3 diopters possible), constituting 273 or more (e.g., to 500) stock keeping units is desired. Within this matrix, there is a unit-volume frequency distribution curve which has at its approximate center a zero-power lens and which generally shows reduced frequency as sphere or cylinder power increases. To satisfy most incoming prescriptions on a statistical basis, a large matrix of stock keeping units must be maintained and inventoried for quick order turnaround if a particular manufacturer or lens type is to become popularly accepted in the market. The sets of lenses can be provided with a range of prescriptions within the normal distribution of prescriptions. About five hundred different types of lenses, differing in curves (e.g., the front lens could have segmented correction for farsightedness or the continuous lens of no-line correction for farsightedness), level of correction (at least 0.1 diopters difference between lens blanks, preferably at least 0.2 diopters differences, more preferably at least 0.25 or about 0.25 diopters difference up through a maximum range of about ±3.0, ±4.0 or more of diopter range). The back lenses will usually just have the prescription portion from about +3 to −5 diopters (at least 0.1 diopters difference between lens blanks, preferably at least 0.2 diopters differences, more preferably at least 0.25 or about 0.25). In the back lens, an additional variation that would be provided is in the cylinder of the lens. This would range from 0.00 up to about −2.00, again with the same level of incremental variation as the diopters corrections for the other variable aspects ((at least 0.1 diopters difference between lens blanks, preferably at least 0.2 diopters differences, more preferably at least 0.25 diopter increments or about 0.25 diopters). In this manner a set of front lenses would have variations of color, scratch resistance, diopter, line or no-line correction and the like, and a set of back lenses would have the possibility of these same variations, without the line or no-line nearsightedness correction. Only one of the sets of lenses should have the color option, but both sets may have the option and include colorless lenses as an option.

Once the individual lens blanks have been selected according to these known procedures, adhesive is placed between the two lens, between the convex face of the rear lens and the concave face of the front lens. The adhesive is preferably radiation curable (e.g., UVA, UVB, UVC, visible radiation, near infrared radiation, infrared radiation, e-beam, etc.) But may be coated with active catalyst therein, be thermally activatable, or may be applied in a thermoplastic state and then cooled. It is preferred to use a radiation sensitive polymerizable polymer system (as further described herein). The adhesive material is preferably an ethylenically unsaturated polymerizable material and most preferably a monomer, oligomer or polymer (or combination thereof) having ethylenically unsaturated groups, especially acrylic or methacrylic groups (generically included within the term (m)ethacrylic). These materials do not have to be derived from monomers which are exclusively of an acrylic nature, and in fact preferably comprise polymer-backbones other than acrylic materials with pendant acrylic groups or with graft or block copolymers with acrylic groups. For example, urethane backbones (e.g., U.S. Pat. No. 4,304, 923), polyester backbones, vinyl resin (e.g., polystyrene) backbones, polysiloxane resin backbones and the like with (m)ethacrylic functionalities are highly desirable and commercially available. Monomers which are capable of more than two-dimensional structuring in their cures (e.g., crosslinkable monomers) are also desirable. Such materials as trimethylolpropanetriacrylate, pentaerythritol tetraacrylate and triacrylate may be used to that effect. Comonomer such as (m)ethacrylic acid, (m)ethacrylic anhydride, n-butylacrylate, isobornyl (m)ethacrylate, and the like may be used to advantage in the compositions of the present invention. The terminology of (meth)acrylic, for example, indicates that either the acrylic or methacrylic analogs may be used. Photoinitiators, and photoinitator systems with spectral sensitizers are preferably used with the polymerizable compositions. The photoinitiators are selected on the basis of their recognized compatibility with the particular polymer systems selected. The photopolymerizable systems are also preferably provided in a neat composition, free of non-polymerizably reactive solvent or at least comprising less than 10% by weight of polymerizable materials of non-polymerizable solvent components.

The adhesive may be applied to the convex surface of the rear lens blank element and the front lens blank element associated therewith or the adhesive may be applied to the concave face of the front lens blank element and then the convex face of the rear lens blank element nestled into the concave side of the front lens blank element. The latter is preferred. The adhesive is then spread between the two lens blanks while they are in contact through the adhesive. The front and rear lens blanks may never actually contact each other surface to surface, but they are in constructive contact through the adhesive layer between them. The spreading can be effected by the natural pressure or weight of the top lens blank on the liquid, by the addition of pressure to the top lens blank to spread the adhesive, the use of reduced environmental pressure around the lens blanks with the liquid adhesive between them (referred to generally as the lens blank association or lens blanks association with adhesive, implying that the lens blanks are associated but not fully bonded by a hardened adhesive), or the preferred method of spinning the lens blank association to allow the rotational, centrifugal forces to spread the adhesive. As will be described in greater detail, the use of a spinning action on the lens blank association surprisingly spreads the adhesive more easily, with less erratic flow, and with fewer bubbles than other methods cause.

The lens blanks and the lens blank association may be carried within a carriage that is moved back and forth within the system, thereby providing a significant level of automation into the process and apparatus. For example, the carriage may have a nesting site or support site for at least the first down lens blank (preferably the front lens blank with the concave side facing up) and preferably for each of the lens blanks (preferably with the concave face of the lenses facing up). In a preferred embodiment a drip tray for catching waste, excess, or deliberately expelled adhesive may be provided. As noted, the lenses may be assembled in any order (e.g., with the front lens down first and concave side up or the rear lens down first with the convex side up) with the adhesive applied in between the two lens blanks, with the first ordering being preferred. This may be accomplished in a variety of ways, including at least the following.

A first down lens is placed within a receptor site. The receptor site preferably provides free rotational support of the first down lens blank. By free rotational support is meant that the lens blank is supported against movement in an axis parallel to the optical axis, but the lens blank may be rotated about the optical axis. For example, if a front lens is placed on a form fitted support or even a flat surface, the lens cannot move parallel to its optical axis, but can freely rotate without physical obstruction, particularly of the type that would produce forces perpendicular to the optical axis and could cause the lens to flex. Flexing of the lens, and hence such perpendicular pressure against the lens blank during lamination are undesirable. This perpendicular pressure does not require that the edges of the lens blanks may not contact walls, support elements, or other features within the apparatus, but these features of the apparatus should not apply more than 100 grams of such perpendicular pressure, preferably less than 50 grams, still more preferably less than 25 or less than 10 grams of force against the edges of the lens blank in a direction approximately perpendicular to the optical axis. The second lens blank is applied to the approximately fitted or mating surface of the first down lens blank after an adhesive has been applied on the vertically facing surface of the first down lens blank so that the adhesive lies between the two lens blank elements.

The adhesive may be applied in any convenient manner, although the most preferred method is described in detail later herein, that method being automatic application of a controlled amount of adhesive onto a surface (preferably a concave surface of the front lens blank) by a syringe applicator. When the adhesive is applied to the first lens blank surface and the second lens blank is placed into constructive contact with the first lens blank through the adhesive, the adhesive may be spread to cover essentially the complete zone of overlap between the two lens blanks. For example, when the first down lens is the front lens blank, the adhesive is applied in a controlled amount to a surface (preferably the concave surface, the rear lens blank contacted with the adhesive, and then the adhesive is spread. The rear lens blank, in a preferred embodiment has a dimension of width that is smaller than the front lens blank (for reasons explained in detail later herein). Therefor, as the lens blanks overlay each other, the front lens blank is exposed around the edges of the rear lens blank because of its greater width. The adhesive should preferably extend to the complete width of the rear lens blank to assure complete bonding, without gaps, between the two lens blanks, but does not have to extend to the complete width of the front lens blank. This could be accomplished, especially where a tacky film adhesive is applied between the two elements and does not have to be spread. However, as the preferred embodiment is a liquid adhesive application and even where the entire surface were coated with a liquid adhesive the adhesive would then have to be spread to uniformity between the two lens blanks, rather than allowing the adhesive to collect in non-uniform dimensions of thickness. The spreading may be accomplished in a number of ways. There may be force applied with a component parallel to the optical axis of the lens blanks (which tend to be approximately parallel after being placed into an association of lens blanks). The weight of the uppermost lens blank tends to apply some effective force is spreading the liquid adhesive between the lens blanks. This is particularly true where the rear lens blank is laid first down with the convex surface facing upwardly. The liquid is thereby able to flow along the surface of both lenses (the two surfaces facing each other) with gravity pressing the uppermost lens towards the first down lens blank and gravity pulling the liquid along the interface of the lens blanks as they tend to slope downward. A reduced pressure environment may be provided around the edge of the lens blanks, tend to assist in moving the liquid outwardly. However, these are not the preferred method of spreading for various reasons. The preferred method assist the flow of the liquid adhesive by rotating the lens blank association generally around an axis that is approximately parallel to the optical axis of the lens blanks. The speed of rotation may be varied significantly from a few revolutions per minute (e.g., at least 5, at least 10, at least 20 or at least 25 revolutions per minute up to 100, 200, 300, 400, 500, 600 or even 800 revolutions per minute). The rate of rotation would be varied because of the viscosity of the adhesive at the temperature of spreading, the surface tension between the adhesive and the lens surfaces, the thickness of the adhesive layer, the separation distance between the two lens blanks, the curvature of the lens blanks, the speed with which the spreading is desired, and the like.

The lens blanks may be manually positioned in the support sites or they may be mechanically and automatically positioned in one or more support sites. For example, where the carriage has two support sites, one for the front lens blank and a second for the rear lens blank, both lens blanks may be manually placed in their respective support sites or mechanically drawn from a pool and placed in their respective lens blank support sites. As later explained in greater detail, there may be registration marks or tabs, or inserts on the lens blanks that enable them to be initially placed in a specifically desired alignment within each of the lens blank support sites. For example only, where the carriage moves along a specific X axis during lamination, the registration marks or tabs may position the individual lens blanks in a specific orientation (e.g., the vertical axis of each lens) with respect to the X axis movement of the carriage. In this manner, the cylinder and/or spherical alignment of the two lens blanks may be specifically presented to the apparatus. As the cylinder/sphericity orientation has to be rotated into proper position (either by rotation of the front lens blank or by rotation of the rear lens blank), and its is desirable to perform this automatically by the system and apparatus, the lens blanks are initially presented within the apparatus in a determinable position with respect to their vertical axes. From that determinable position, the amount of rotation may then be precisely and automatically performed.

After the two lens blanks are present in the support sites within the carriage, and the adhesive is applied on one of the faces of one of the lens blanks (preferably the concave surface of the first down front lens blank with the concave side facing up), the second, rear lens blank is contacted with the adhesive, the convex face of the rear lens facing the concave face of the front lens blank. When the convex face of the rear lens makes initial contact with the adhesive, it has been surprisingly found that it is advantageous, but not functionally essential, to first break the constructive contact between the two lens blanks and the adhesive. This optional step is performed by applying the liquid adhesive to a first lens blank, lowering a second lens blank into contact with the adhesive on the first lens blank, causing constructive engagement of the two lens blanks through the adhesive, then raising the second lens blank to break the adhesive contact so that some liquid adhesive remains on the first lens blank and some liquid adhesive remains on the second lens blank. The second lens blank, with adhesive thereon, is then lowered, bringing the liquid adhesive on the second lens back into contact with the liquid adhesive remaining on the first lens. This sequence of steps, referred to herein as 'double dipping,' assists in the elimination of bubbles in the adhesive layer. This is of obvious importance as the presence of bubbles provides a visible optical defect in the laminated lens. The mechanism by which this sequence of steps provided a benefit is not fully known, but the optional step reduces the occurrence of bubbles. The adhesive must then be spread before it hardens.

Although the other spreading methods described above may be used, including but not limited to gravity flow, sandwiching pressure flow, evacuation reduced pressure flow, heating to reduce the viscosity and accelerate flow, and mixtures thereof, the use of rotational forces (alone or in combination with the other flow mechanisms) is a preferred method. It is desirable to rotate the association of lens blanks (with the adhesive there between) about a rotational axis that is close to the optical axis of the association of lens blanks. The axis of rotation for the adhesive spreading process should be within about thirty (30) degrees of the optical axis of the association of lens blanks and should be within about one-half of the radius of the lens blank association. That is, the axis of rotation does not have to be identical with the optical axis, but should be sufficiently close enough thereto that the adhesive will not move in only one direction relative to the association of lens blanks, but move outwardly from the approximate center of the lenses and spread to all edges of the association of lens blanks. The speed of rotation that is optimal depends upon the particular adhesive used, the specific surfaces of the lenses, the ambient temperature, the heated temperature of the lens blanks and adhesive, the weight of the lens blanks, the size of the lens blanks (particularly the diameter), and other physical factors in the system. Generally the speed of rotation, if rotational forces are used to spread the adhesive, will be above five (5) rpm, usually within the range of five (5) to eight hundred (800) rpm, more generally between the range of at least 10, at least 20, at least 25, at least 50, at least 75 or at least 100 rpm, up to 800 rpm, up to 700 rpm, up to 600 rpm, up to 500 rpm, up to 400 rpm, or up to 300 or up to 200 rpm. With the most preferred class of photosensitive acrylate polymer systems used in a practice of the present invention, the preferred rotational speed is about 25 to 300, or 50 to 250 rpm.

The lens blanks may be associated with manual placement of the individual lens blanks on the carriage or by semi-automatic placement of the lens blanks as described herein. For example, the individual lens blanks my be placed manually into the two lens support sites on the carriage, or may be placed there mechanically, with vacuum holders lifting and moving each lens blank or grasping elements (tongs, mechanical fingers, gripping elements or the like). One system practiced has each of the two lens blanks manually placed into their respective support sites, and then has the second lens blank mechanically lifted and placed onto the first lens blank with the adhesive thereon. This can be done by moving a vacuum lift arm over the second blank, lifting the second lens blank, then lifting the second lens blank, moving the second lens blank over the first lens blank with adhesive thereon, and depositing the second lens blank (with or without double dipping) onto the adhesive containing face of the first lens blank. Another method within the scope of the present invention has the mechanical lifter bring or raise the second lens blank and then have the carriage move the first lens blank to a position underneath the second lens blank. The mechanical lifter then lowers the second lens blank onto the first lens blank, without the mechanical lifter having moved in any direction other than vertically during possession of the second lens blank.

The first down lens support site within the carriage may have a rotational capability within the frame to provide the adhesive flow rotation desired for spreading of the adhesive layer, or the entire carriage may be rotated (less preferred). For example, the first down lens support site may comprise a support surface on a rotatable element or a support surface that has bearings and mechanically rotating means (a motor, gearing, drive force, etc.) that will cause the support surface to rotate within the carriage. In this manner, the association of lens blanks does not have to be removed from the carriage during rotation and/or during hardening of the liquid adhesive. As noted, the liquid adhesive in the lens blank association may be hardened in any convenient manner, such as cooling, thermal polymerization, radiation initiated polymerization, pre-activated polymerization, and the like. The preferred mechanism is the radiation initiation of a curable or polymerizable system as the adhesive. With a rotating capability within the first down lens support site, the association of lens blanks may be rotated to the spread the adhesive and the initiating radiation source brought to a position to expose the lens blank association or the carriage may be moved to a radiation source for exposure, the latter being preferred. The association of lens blanks may be rotated before being associated with the radiation source, during exposure by the radiation or both. After sufficient exposure to radiation to harden the adhesive layer between the lens blanks, the laminated ophthalmic lens (rather than a mere association, as the two lens blanks are now essentially permanently laminated or bonded together) is move away from the radiation source (either by removing the source or moving the carriage away from the zone where the radiation source remains). The laminated ophthalmic lens is now ready for sizing to fit a frame. Reference to the Figures may assist in appreciating more detailed points with respect to practice of the invention.

Figure 4:
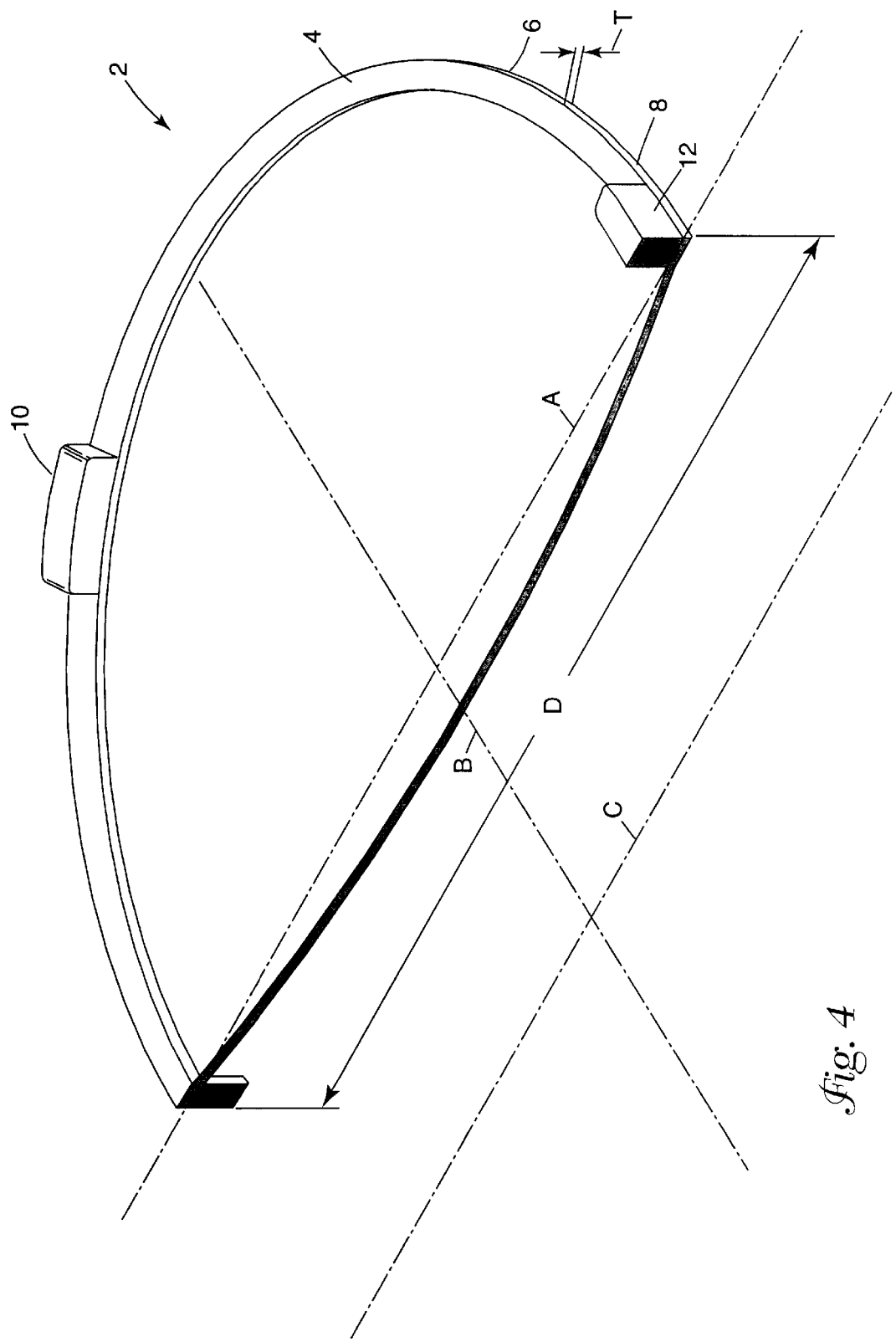
FIG. 4 shows a cutaway view one configuration for a front lens blank that may be used according to one of the preferred practices of the present invention.

FIG. 4 shows a cutaway view one configuration for a front lens blank 2 that may be used according to one of the preferred practices of the present invention. The front lens blank 2 is shown with a front or exterior side 6 and a rear or interior side 4. There is a rearward facing edge 8 formed by the thickness T of the lens blank 2. There are three projections, tabs or posts 10, 12 and 14 shown facing rearwardly from the edge 8. These posts are shown along one side only of the cutaway view of the lens blank 2, but of course and preferably, the posts would be more evenly distributed so that they are not all on the same side (here the rearward side) of the lens blank 2. The posts 10, 12 and 14 do not have to be precisely aligned or coextensive with the width of the edge 8, but the alignment shown in FIG. 4 is convenient to use and manufacture (molding) of the lens blank 2. Also shown in FIG. 4 is a positioning tab 16 which would be positioned within a recess in a support (not shown) to secure the front lens blank 2 during lamination. Virtual lines A, B and C define a diameter D within the lens blank 2 which would be used within a frame of optical glasses (not shown). The diameter D must be such that the posts 12, 14 and 14 should or would be removed from the lens blank 2 for insertion into the frame. It is not desirable or particularly beneficial to have the posts on the lens within the frame after completion of the process. Part of the process of the invention, with respect to combining the two lenses to be adhesively secured comprises the removal of the posts or protrusions before insertion of the lenses into frames in an edging process.

FIG. 5 shows a cutaway view of a prelamination association 20 comprising a front lens 22, a rear lens 24 and an intermediate, unspread layer of curable adhesive 26. Two (of the preferred three) projections 36 and 38 are shown on the backside facing edge 32 of the front lens 22. A positioning tab 34 is also shown on the exterior or front face of the front lens blank 22. As can be seen, there is a angular spacing 40 and 42 (along the circumference of the lens) along the outermost edge 32 of the rear or back lens 24 and the projections 36 and 38. The spacings 40 and 42 are purposefully shown to be different. Although centering of the rear lens 24 with the front lens 22 is typically the target for alignment of the optical axes of the lenses 22 and 24, as long as the tolerances for alignment are met, these spacings 40 and 42 do not have to be equal. In general, the spacing between the inside edges or faces (50 or 52, diagonally or at least crossing over the front lens) should not be able to exceed about twice (two times) the limit of tolerance for alignment of the optical axes of the two lens blanks 22 and 24. In the case where the slippage of the rear lens 24 along the backside 44 of the front lens 22 is at this limit between two posts 36 and 38 of twice the optical axis displacement tolerance, one of the edges 46 or 48 will be touching a projection 36 or 38 and the other spacing 38 or 36 will be at the maximum of twice the tolerance or optical axis misalignment. A ridge element 49 may also be located on one or more projections (e.g., shown here on 36) to restrict slippage or to assure that slippage or lifting is avoided. A roughening outside of the prescription viewing area of the final lens (e.g., near the outer edges of the lens blanks) of the inside surface, forward facing surface 54 or the interior surface 56 of the front lens 22 or the inside surface of a projection 58 can also be used to assure that the projection 38 reduces the degree of slippage of the rear lens blank 24 desired in the lamination of the front and rear lenses. A groove or complete ledge around the exterior of the lens blank, or any other physical feature (including topography and frictional effects) preventing slippage between the two associated front lens blank and rear lens blank can be used. It is also important for these combinations of features to assure concentricity or center to center alignment of the optics of the two lenses, within the parameters elsewhere described in the practice of the present invention.

Figure 3:
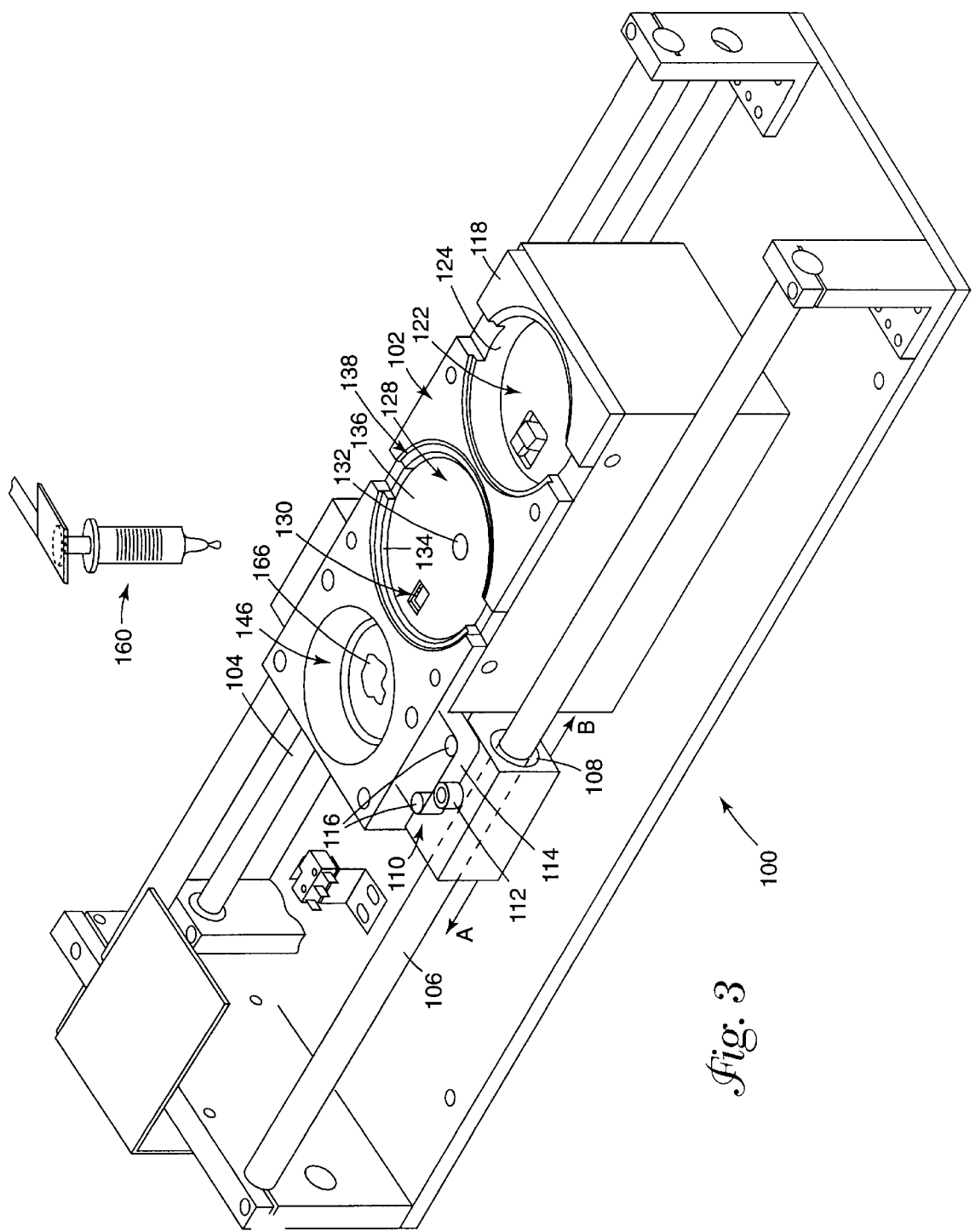
FIG. 3 shows a perspective view of a carriage element that has shifted position to have adhesive applied to the concave side of a front lens blank.

FIG. 1 shows a carriage assembly 100 according to the present invention. The carriage assembly 100 comprises a carriage 102 that is carried on a conveying means, here shown a slide bars 104 106. These slide bars 104 106 support the carriage 102 in glide supports 108. The carriage 102 may be moved forward A or backward B by a motivating system such as screw drive (not shown), air cylinders (not shown), pneumatic system (not shown), spring control system (not shown), or any other mechanical or magnetic drive system. Shown in FIG. 3 is a contact pressure driven belt system 110 comprising a contact driving element 112 (which may be any element, such as a rubber coated post, that contacts the slide bar 106 to motivate or move the carriage 102. The contact driving element 112 may be itself driven by a belt 114 guided along posts 116. The belt 114 may be driven by any type of motor (not shown). The drive system is preferably moved with reduced amounts of vibration that could shift components or elements within the system so pneumatic drives, step drives, microstepping drives and other systems known to allow for smooth, reduced vibrational movements are desired. Reduced vibrations in the system also tend to reduce the formation of bubbles in the liquid adhesive. The top 118 of the carriage 102 is shown to be provided with a second down lens blank support site 120 that is shown as a receiving area for a (preferably) rear lens blank. The support site 120 comprises a recessed area 122, walls 124 and a functional element 126. The functional element 126 may provide many different functions in the practice of the invention, yet is still an optional element used for preferred practices. For example, as shown in FIG. 3, the functional element 126 is raised above the bottom of the recessed area 122. The functional element 126 my therefore physically engage with the lens blank inserted into the recessed area to align the lens blank. The functional element 126 may thus cooperate with the lens blank to have the orientation, sphericity, cylinder, power functions, designs or other features of the lens blank set in a specific and known position or relationship with regard to the carriage, e.g., with the vertical orientation of the lens blank lying parallel to the line of movement A B of the carriage 102. The functional element may also provide a sensing function for indication of the presence and/or alignment of the lens blank. A second lens blank support site 128 is shown, usually for the first down lens blank, the front lens blank in the preferred method of practice. The first down lens blank support site 128 comprises a functional area 130 and center rotational segment 132 and walls 134. The functional area 130 is also optional, but highly preferred. That functional area 130 may include a receiving hole for a tab or projection from the first down lens blank (e.g., the front lens blank, as described above), and may contain a sensing function to assure the presence of a first down lens blank during the lamination operation. The rotational segment 132 merely displays a segment around which the first down lens blank support 128 may rotate. The indicated rotational segment 132 may be a swivel post, bearing, free-rotating post, or any other element that would enable rotation of a center plate 136 of the first down lens blank support site 128. The rotation of the center plate 136 may be driven by any motivating or rotating drive (not shown) within the carriage 102. The center plate 136 may rotate (with control or freely) within rotational frame 138. A first down lens blank would be inserted into the first down lens blank support site 128, the lens blank rotated freely within the walls 134, and a tab on the first down lens blank (not shown) engaged within the functional area 130 to restrict free rotation of the first down lens blank with respect to the center plate 136. A drip plate 140 is shown on the carriage 102, the drip plate 140 optionally being present and used to catch liquid adhesive intentionally or unintentionally released over the carriage 102.

In FIG. 1, a Lens blank lifting or transporting system 150 is shown. The lifting system comprises a frame 154 having an extendable vacuum support 152 that is able to move along axis C with respect to the frame and the carriage 102. The carriage 102 may move from one position to align the axis of movement C of the extendable vacuum support 152 with a lens blank support site such as 120. The extendable vacuum support 152 and/or the frame 154 may move towards and/or away from the carriage 102. The vacuum element 156 on the extendable vacuum support 152 then engages a lens blank (usually at least the second down rear lens blank), holds the lens blank. Lifts the lens blank as the extendable vacuum element 152 is retracted, and then engages the held lens blank with the adhesive coated first down lens blank, with the carriage (or less preferably, the extendable vacuum support element 152) moving to align the second down lens blank with the first down lens blank. The extendable vacuum support element 152 in the double dipping operation described above will place the second down lens blank in contact with the adhesive of the first down lens blank, causing a wetting of the front surface of the second down lens blank, with a meniscus forming between the liquid adhesive and the front surface of the second down lens blank. The extendable vacuum support element 152 is then retracted, breaking the meniscus and the constructive contact between the two lens blanks. Some amount of the liquid adhesive remains on the front surface of the second down lens blank after the lens blank is retracted from the first down lens blank. The extendable vacuum support element 152 is then extended again towards the first down lens blank, the liquid on the surface of the second down lens blank making contact with the liquid adhesive of the surface of the first down lens blank. Continued extension of the extendable vacuum support element 152 causes some spreading of the liquid adhesive between the two lens blanks, as does release of the second down lens blank by the extendable vacuum support element 152.

The application of the liquid adhesive may be performed by any convenient means, a drip applicator, manually, a tube applicator built into the carriage 102, spray applicator, brush applicator, extrusion applicator or the like. In a preferred practice of the invention, a syringe applicator 160 is provided. The syringe applicator 160 carries the liquid adhesive in a cartridge (e.g., to protect it from air, especially oxygen or moisture, depending on the composition of the adhesive). The syringe may be moved over the first down lens blank support site 128 for depositing the liquid adhesive. Preferably, as with the extendable vacuum support element 150, the carriage is moved into alignment with the syringe 160 that is preferably fixed, except for its ability to move vertically, closer to and farther from the carriage 102. The syringe 160 has a delivery tip 162 from which the liquid adhesive is applied. This system may be again substantially fully automated, with the adhesive applied by signals from a computer controlling the entire operation of the lamination system and carriage system 100. For example, before applying the liquid adhesive to the first down lens blank, the carriage 102 is directed by the computer to be moved so that the drip plate 140 is directly under the syringe 160. The computer signals for a defined amount of liquid adhesive to be sent through the delivery tip 162 of the syringe 160 to prime the syringe, with a small amount of liquid adhesive 164 then preferably remaining on the delivery tip 162. This priming step tends to reduce the occurrence of bubbles in the application of the liquid adhesive. The expended liquid adhesive 166 is then collected in the drip plate 140. The interior surface of the drip plate may have a removable section, such as a paper cup, foil cup, plastic cup, or the like so that the drip plate 140 does not have to be extensively cleaned, but rather the removable section removed, and then replaced with another removable section.

In one practice of the invention, after the association of lens blanks has been formed in the carriage 102, and the association is rotated within the carriage, the carriage is again moved into a radiation exposure zone (not shown). The radiation exposure zone may comprise a housing with a radiation emitter therein, such as a bank or series of UV emitting lamps, with the wavelengths of emissions including the wavelengths to which a curable polymeric system is sensitive. The association of lens blanks is either initially spun before exposure to the radiation emitters, spun as it is introduced, or spun shortly after initial exposure. The rotation of the association of lenses may be discontinued after the adhesive has spread to the outer edges of the smaller diameter of the two lens blanks in the association of lens blanks (which might be of the same diameter, but that is less preferred). The rotation may be stopped when the liquid adhesive has reached the outside diameter of the smaller of the two lens blanks or continued for any period of time while or after the UV exposure and hardening of the liquid adhesive occurs.

Figure 2:
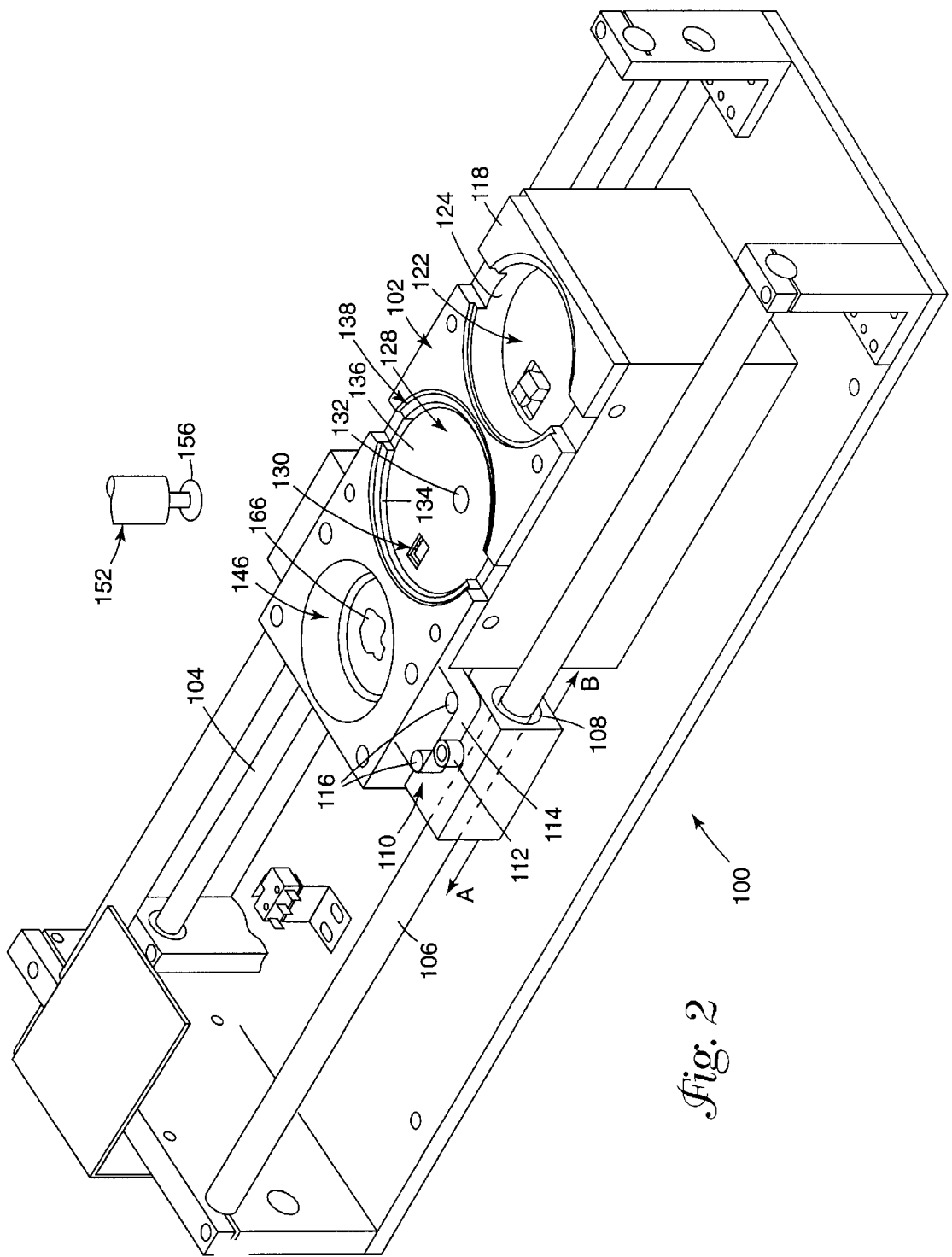
FIG. 2 shows a perspective view of a carriage element that has shifted position to be addressed by a lens transport means.

In FIG. 2, the carriage assembly 118 has shifted its position so that the front lens cavity 128 is directly located under the extendable vacuum support element 152. In this position, the vacuum support element 156 would hold a rear lens (not shown) and deposit it onto the front lens (not shown) that would reside in the front lens support cavity 128.

In FIG. 3, the carriage assembly 118 has shifted its position so that the front lens cavity 128 is located directly below the syringe liquid adhesive applicator 160. In this position the syringe applicator 160 would deposit liquid adhesive onto the rear surface (not shown) of a front lens blank (not shown) residing in the front lens cavity 128. Similar translational movement of the carriage 118 places the lens or lens association into the proper position for performing the process of lamination and adhesive deposition and other steps described in the practice of the present invention.

There are many subtleties that may be practiced in the present invention including the following special features:

1) In the association of lens blanks, the outer edge of the smaller diameter lens blank (usually the rear lens blank) may be beveled, with the bevel on the outside edge being shown in FIG. 4. The bevel should preferably be within 5 to 70 degrees along the angle (Theta) noted in FIG. 4. This beveled edge enables the liquid adhesive to wick onto the edge of the smaller diameter lens more easily, and assure better adhesion between the two lenses.

2) The exposure to radiation, such as UV radiation, may extend beyond the period of time minimally necessary for hardening, as for 30 seconds to five (5) minutes.

3) Surfactant may be added to the adhesive composition to reduce the formation of bubbles in the adhesive layer.

4) A software program may be establish to operate with the automated or semi-automated system of the present invention, with the software a) requiring sensing of the presence of lens blanks in each lens blank support site before movement of the carriage or application of the adhesive; b) sensing or recording the amount of adhesive used from the syringe so that a replacement 5) The need to avoid the formation of bubbles in the adhesive layer during the lamination process may require the consideration and addressing of many rheologic properties and surface properties and surface tension properties of the materials used. The addition of surface active agents to liquid and/or solid compositions (e.g., mold surfaces, lens forming compositions, surface or additive layers on the lens and adhesive, etc.), the use of electrical discharging systems (to discharge or prevent static buildup), antistatic protection by way of physical or chemical additives (such as cationic, anionic, zwitterionic, non-ionic surfactants and combinations thereof), vibration to reduce bubble formation, vacuum application to reduce the availability of gases, and the like may need to be practiced. For example, the application of a charge to the surface of the mold and/or the lens blank (e.g., at least 0.5 kV, at least 1.0 kV, at least 2.0 kV or at least 3.0 kV, up to as much as 5 or 10 kV) has been found to affect the occurrence of bubble formation in the adhesive. It has been found that the application of at least (+)1.0 kV, preferably 1–5 kV, especially about 1–4 kV on the front side of the back lens wafer assists in the reduction of bubble formation. Although the Inventors do not wish to be held to a single mechanistic explanation of this benefit, this charging is believed to benefit the compatability of the liquid adhesive and the lens composition, either with respect to surface tension, surface energies, electrostaic effects, or combinations of these with other relative properties that would affect the smooth and even distribution of the liquid on the lens blank surface.

The examples given herein are intended to be instructive of the general utility of the invention and are not intended to be limiting. Other obvious modifications would be apparent to those of ordinary skill in the art to adjust or optimize the practice of the invention.

What is claimed:

1. A method for the lamination of two lens blanks to form an ophthalmic lens comprising:

a) placing a first ophthalmic lens blanks having two major surfaces thereon on a first lens blank support surface and placing a second ophthalmic lens blank having two major surfaces thereon on a second lens blank support surface;

b) applying a hardenable liquid adhesive to less than an entire one of said at least two major surfaces of said first ophthalmic lens blank while the first ophthalmic lens blank is on said first lens blank support surface;

c) removing the second ophthalmic lens blank from the second lens blank support surface and placing the second ophthalmic lens blank into contact with the hardenable liquid adhesive, forming an association of two lens blanks with the hardenable liquid adhesive between the two lens blanks;

d) spreading the hardenable liquid adhesive; and e) after at least some of said hardenable liquid adhesive has spread, hardening said hardenable liquid adhesive to laminate the two lens blanks into a laminated ophthalmic lens, wherein both the first lens blank support surface and the second lens blank support surface are each recessed areas on a carriage element, so that as said carriage element moves, both the first lens blank support surface and the second lens blank support surface move, after the first ophthalmic lens blank has been placed on the first lens blank support surface, the carriage is moved to a first position where hardenable liquid adhesive is applied to the first ophthalmic lens blank and then the carriage is moved to a second position where the second ophthalmic lens blank is placed into contact with the hardenable liquid adhesive on the first ophthalmic lens blank, the second ophthalmic lens blank is placed into contact with the hardenable liquid adhesive by lifting the second ophthalmic lens blank from the second ophthalmic lens blank support surface to a stationary elevated position and then moving the carriage to a position where the first ophthalmic lens blank with hardenable liquid adhesive thereon is under the stationary elevated position of the second ophthalmic lens blank, and then the second ophthalmic lens blank is lowered into contact with the hardenable liquid adhesive, wherein after the second ophthalmic lens blank has contacted the hardenable liquid adhesive, the second ophthalmic lens blank is elevated so that some second portion of the hardenable liquid adhesive remains on the second ophthalmic lens blank, some first portion of the hardenable liquid adhesive remains on the first ophthalmic lens blank and the second portion and the first portion are not in contact with each other.

2. The method of claim 1 wherein after the first portion and the second portion are not in contact with each other, the second ophthalmic lens blank is lowered to place the first portion and second portion into contact with each other.

3. The method of claim 2 wherein after placing the first portion and second portion into contact with each other, the hardenable liquid adhesive is spread between the first ophthalmic lens blank and the second ophthalmic lens blank, forming the association of two lens blanks with the hardenable liquid adhesive between the two lens blanks.

4. The method of claim 3 wherein the hardenable liquid is hardened by exposure to a sufficient amount of radiation to polymerize the hardenable liquid adhesive.

5. The method of claim 4 wherein said hardenable liquid adhesive is applied by depositing hardenable liquid adhesive from a syringe applicator onto a concave surface of the first ophthalmic lens blank.

6. The method of claim 5 wherein prior to applying said hardenable liquid to the first ophthalmic lens blank from the syringe applicator, an amount of hardenable liquid adhesive is expelled from the syringe applicator onto a surface other than an ophthalmic lens blank.

7. The method of claim 6 wherein the surface other than an ophthalmic lens blank is a drip tray attached to said carriage.

8. The method of claim 2 wherein the first ophthalmic lens has a lens blank support area that has a recessed area or projection that engages with a projection or recessed area, respectively, on the first ophthalmic lens blank.

9. A method for the lamination of two lens blanks to form an ophthalmic lens comprising:

providing a first ophthalmic lens blank having two major surfaces thereon;

applying a hardenable liquid adhesive to less than an entire one of said at least two major surfaces of said first ophthalmic lens blank;

placing a second ophthalmic lens blank into contact with the hardenable liquid adhesive, forming an association of two lens blanks with the hardenable liquid adhesive between the two lens blanks;

rotating said association of two lens blanks to assist in spreading the hardenable liquid adhesive; and after at least some of said hardenable liquid adhesive has spread, hardening said hardenable liquid adhesive to laminate the two lens blanks into a laminated ophthalmic lens;

and the first ophthalmic lens has a lens blank support area that has a recessed area or projection that engages with a projection or recessed area, respectively, on the first ophthalmic lens blank, wherein
 a) the first ophthalmic lens blank comprises a polymeric front optical element blank to be laminated to
 b) the second ophthalmic lens blank comprising a rear optical element blank comprising an optical element having an exterior convex surface and an interior concave surface, with an edge between said exterior convex surface and an interior concave surface,
 c) the first ophthalmic lens blank having at least two projections extending away from and higher than an edge on a side of the first ophthalmic lens blank having a concave surface, and
 d) the second ophthalmic lens blank forming the association of two lens blanks with the hardenable liquid adhesive between the two lens blanks by being positioned between the at least two projections.

10. The method of claim 9 wherein the first ophthalmic lens blank has at least three projections extending away from and higher than an edge on a side of the first ophthalmic lens blank having a concave surface and the second ophthalmic lens blank forming the association of two lens blanks with the hardenable liquid adhesive between the two lens blanks by being positioned between the at least three projections.

11. The method of claim 9 wherein said association of two lens blanks is rotated to assist in spreading the hardenable liquid adhesive and during said rotating, the second ophthalmic lens blank is in contact with at least one of said at least two projections.

12. The method of claim 10 wherein said association of two lens blanks is rotated to assist in spreading the hardenable liquid adhesive and during said rotating, the second ophthalmic lens blank is in contact with at least one of said at least three projections.

13. A method for the lamination of two lens blanks to form an ophthalmic lens comprising:

a) placing a first ophthalmic lens blank having two major surfaces thereon on a first lens blank support surface and placing a second ophthalmic lens blank having two major surfaces thereon on a second lens blank support surface;

b) applying a hardenable liquid adhesive to less than an entire one of said at least two major surfaces of said first ophthalmic lens blank while the first ophthalmic lens blank is on said first lens blank support surface;

c) removing the second ophthalmic lens blank from the second lens blank support surface and placing the second ophthalmic lens blank into contact with the hardenable liquid adhesive, forming an association of two lens blanks with the hardenable liquid adhesive between the two lens blanks;

d) spreading the hardenable liquid adhesive by rotation of the association of two lens blanks; and e) after at least some of said hardenable liquid adhesive has spread, hardening said hardenable liquid adhesive to laminate the two lens blanks into a laminated ophthalmic lens, wherein both the first lens blank support surface and the second lens blank support surface are each separate recessed areas on a carriage element, so that as said carriage element moves, both the first lens blank support surface and the second lens blank support surface also move, after the first ophthalmic lens blank has been placed on the first lens blank support surface, the carriage is moved to a first position where hardenable liquid adhesive is applied to the first ophthalmic lens blank and then moved to a second position where the second ophthalmic lens blank is placed into contact with the hardenable liquid adhesive on the first ophthalmic lens blank, the second ophthalmic lens blank is placed into contact with the hardenable liquid adhesive by lifting the second ophthalmic lens blank from the second ophthalmic lens blank support surface to a stationary elevated position and then moving the carriage to a position where the first ophthalmic lens blank with hardenable liquid adhesive thereon is under the stationary elevated position of the second ophthalmic lens blank, said hardenable liquid adhesive is applied by depositing hardenable liquid adhesive from a syringe applicator onto a concave surface of the first ophthalmic lens blank, and wherein the first ophthalmic lens blank has at least three projections extending away from and higher than an edge on a side of the first ophthalmic lens blank having a concave surface and the second ophthalmic lens blank forming the association of two lens blanks with the hardenable liquid adhesive between the two lens blanks by being position between the at least three projections.

14. The method of claim 13 wherein said association of two lens blanks is rotated to assist in spreading the hardenable liquid adhesive and during said rotating, the second ophthalmic lens blank is in contact with at least one of said at least three projections.

15. A method for the lamination of two lens blanks to form an ophthalmic lens comprising:

providing a first ophthalmic lens blank having two major surfaces thereon;

applying a hardenable liquid adhesive to less than an entire one of said at least two major surfaces of said first ophthalmic lens blank;

placing a second ophthalmic lens blank into contact with the hardenable liquid adhesive, breaking contact between the ophthalmic lens blank and the hardenable liquid while retaining some hardenable liquid on the second lens blank and leaving hardenable liquid adhesive on the less than an entire one of said at least two major surfaces of said first ophthalmic lens blank, forming an association of two lens blanks with the hardenable liquid adhesive on both the first ophthalmic lens blank and the second ophthalmic lens blank between the two lens blanks;

spreading the hardenable liquid adhesive; and after at least some of said hardenable liquid adhesive has spread, hardening the hardenable liquid adhesive to laminate the two lens blanks into a laminated ophthalmic lens.

* * * * *